United States Patent [19]

Kuwana et al.

[11] 3,929,572
[45] Dec. 30, 1975

[54] METHOD FOR THE PRODUCTION OF N-ACYLPENTAPEPTIDES

[75] Inventors: Noriaki Kuwana, Inuyama; Kouichi Suzuki, Ichinomiya; Tooru Sugitani, Aichi, all of Japan

[73] Assignee: Eisai Co., Ltd., Tokyo, Japan

[22] Filed: Nov. 8, 1974

[21] Appl. No.: 522,268

[30] Foreign Application Priority Data
Nov. 15, 1973  Japan.............................. 48-127716

[52] U.S. Cl..................................... 195/29; 195/30
[51] Int. Cl.². ........................................... C12D 13/06
[58] Field of Search...................... 195/30, 29, 80 R

[56] References Cited
OTHER PUBLICATIONS
Murao et al., Agr. Biol. Chem., Vol. 35, No. 10, pp. 1477–1487, (1971).

*Primary Examiner*—Alvin E. Tanenholtz
*Attorney, Agent, or Firm*—Wenderoth, Lind & Ponack

[57] ABSTRACT

An improved method for the fermentative production of N-acylpentapeptides by cultivation of Streptomyces naniwaensis (ATCC 21689), a kind of Actinomyces, is provided wherein a nutrient medium is employed for the cultivation of said Actinomyces, said nutrient medium additionally contains a precursor of N-acylpentapeptide; an increased yield of the desired N-acylpentapeptide being thus obtained.

4 Claims, No Drawings

METHOD FOR THE PRODUCTION OF N-ACYLPENTAPEPTIDES

This invention relates to an improved method for the production of N-acylpentapeptides. More particularly, the invention is concerned with a new method for the production of N-acylpentapeptides in a high yield by cultivating Streptomyces naniwaensis in a nutrient medium containing a precursor or precursors of said N-acylpentapeptides.

N-acylpentapeptides obtained in accordance with the present invention are represented by the following general formula:

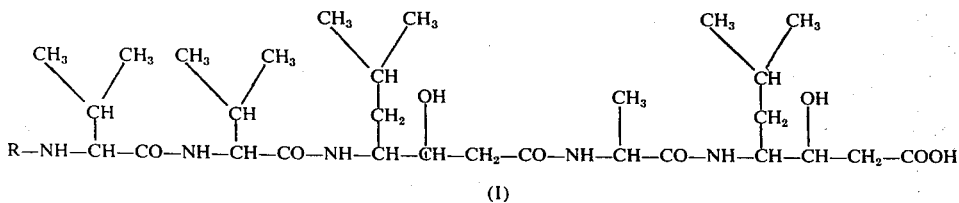

(I)

wherein R is acyl radical.

The N-acylpentapeptides of the above formula (I), wherein R is butyl, propyl or acetyl, are disclosed by N. Kuwana et al in Japanese Patent Application Nos. 39446/73 and 68310/73 as Pepsidines A, B and C.

In Japanese Patent Application No. 35900/70, said Pepsidine C is represented by S. Murao et al as "S-PI". Other N-acylpentapeptides of the above formula (I) having other acyl radicals are known, too.

It is known that all of these N-acylpentapeptides have a high anti-pepsin activity and they are the products obtained by cultivation of various Actinomyceses. Thus, the aforementioned Pepsidines A, B and C are the products of the cultivation of Streptomyces naniwaensis EF 44-201 (ATCC 21689), a kind of Antinomyceses, for example.

For the cultivation of Actinomyces to produce the N-acylpentapeptides, there may generally be employed various nutrient mediums which contain several ingredients conventionally employed in the preparation of the nutrient mediums to be used for the cultivation of other Actinomyceses.

Thus, a nutrient medium, for example, may contain sugars such as glucose and the like as the carbon source; peptone and meat extract, for example, as the nitrogen source; and sodium chloride and various other inorganic salts.

It is known that the yield of N-acylpentapeptides is affected by the kinds and/or relative proportions of these ingredients contained in a given nutrient medium. [See Japanese Agricultural and Biological Chemistry 35, No. 10, 1477–1481 (1971) and Japanese Patent Publication No. 8996/72.]

It has, however, been found that a production of N-acylpentapeptides in a good yield and/or a selective production of a particular N-acylpentapeptide among others could not be attained by the use of a nutrient medium consisting merely of the usual ingredients for the cultivation of Actinomyces.

The present inventors now have found that the yield of N-acylpentapeptides can considerably be increased when a precursor or precursors of the N-acylpentapeptide is/are incorporated into a conventional nutrient medium used for the cultivation of Actinomyces, and furthermore, a particular N-acylpentapeptide can be obtained predominantly when a specific precursor corresponding to the acyl moiety of said particular N-acylpentapeptide is added to the nutrient medium to be used.

The term "precursor" herein used means the substances which will provide a moiety to result in a corresponding N-acylpentapeptide including the substances, which may hereinafter be called "N-acyl radical donor", exemplified by 4-amino-3-hydroxy-6-methylheptanoic acid (AHMHA) per se or in a form of its derivatives, for example.

As for the N-acyl radical donors, there may be mentioned aliphatic acids in a form of their inorganic salts, esters and amides; such as sodium, potassium and ammonium salts of acetic, propionic and butylic acids; such as the esters derived from a higher alcohol, polyalcohol and other alcohols and an aliphatic acid, for example, stearyl- and oleyl acetates, propionates and butylates; and such as the amides derived from an amino radical-containing compounds, for example, an aminoacid and aminosugars, especially, S-acetylvaline and N-acetylglucosamin. In this connection, it has been found that use of a co-enzyme-type acetyl radical donor such as thiol esters of the fatty acids exemplified by S-acetyl glutathion is particularly preferable for the predominant production of Pepsidine C.

The amount of the precursor(s) to be used is not critical. It is, however, usually preferable to use in an amount of 0.05–2.0% by w/v of a single precursor or an admixture thereof on the basis of the employed nutrient medium in order to obtain a desired result according to the present invention.

The precursor or precursors may be incorporated into a nutrient medium in a form of its aqueous solution. They may thus be added at once or intermittently to the medium.

The compositions of the nutrient medium for the concomitant use with the precursos(s) and the conditions employed for the cultivation of Actinomyces naniwaensis EF 44-201 strain in said medium according to the present invention are not critical. Usually, the cultivation may be carried our under shaking and-/or aerating at a temperature of about 20°C. to about 24°C. and for 10 to 120 hours.

The amounts of the Pepsidines produced in the cultivated broth are determined in accordance with the improved procedure for the determination of anti-pepsin activity disclosed in Japanese Patent Application No. 35900/70. Namely, 0.5 ml of a sample taken from the cultivated broth is diluted with a buffer solution to a suitable concentration, and there is added 0.5 ml of a 0.01% pepsin solution. The resulting mixture is warmed at 37°C. for 10 minutes. To the mixture, there is added 2.5 ml of a 1% aqueous casein solution (pH 1.6), warmed at 37°C. for 10 minutes and finally added 2 ml of a 0.55 M trichloroacetic acid. The mixture is held in a boiling water bath for 10 minutes and then icecooled. The resulting precipitate is removed by filtration. To 1 ml of the filtrate, there is added 5 ml of a 0.44 M aqueous sodium carbonate solution and 1 ml of a phenol reagent (Folin's reagent). After warming at 37°C. for 30 minutes, photo-absorption of the mixture is measured at 660 mμ. At the same time, photo-absorption of the buffer solution which does not contain said cultivated broth is also measured as control. The balance between the two photo-absorption values thus obtained is taken as the value of the pepsin activity-inhibitory effect of the sample under test.

Independent of the abovementioned photo-absorption tests, a curve showing the pepsin inhibitory activity as the standard measure is graphically prepared using data of the photo-absorptions obtained in the similar manner as abovementioned with respect to the aqueous solutions which contain the standard crystalline Pepsidine C in the different concentrations.

The total quantities of the Pepsidines contained in the cultivated broth are then obtained by comparative computation of the values of the pepsin-inhibitory activity relative to the abovementioned curve as the standard measure.

According to the present invention, N-acylpentapeptides, as will be obvious from the results obtained in the following working Examples, are obtained in higher yields than those obtained by the known arts. Furthermore, it is particularly notable that a marked enhancement in the yield of an intended specific N-pentapeptide can be attained by a selected use of the precursor.

Following Examples will serve to illustrate the specific embodiments of the invention without limitation.

EXAMPLE 1

15 Liters of a nutrient medium containing 3% of glucose, 3% of peptone, 1% of meat extract and 0.5% of sodium chloride were prepared, which hereinafter called "nutrient medium A". The nutrient medium A was sterilized in a 30 liter jar fermentor in accordance with a usual manner. After the sterilization with steam, the total volume of the sterilized nutrient medium amounted to 15.6 liters and had pH 6.5.

300 ml of a liquor of Streptomyces naniwaensis EF 44-201 strain separately cultivated were inoculated to the abovementioned sterilized nutrient medium, and the mixture was cultivated at 27°C. for total 44 hours while agitating at 300 r.p.m. under aeration with 15 liters per minute of sterile air. After the cultivation for 21.5 hours, 500 ml of an aqueous solution which contained 150 grs. of sodium acetate were intermediately added to the cultivating liquor and the cultivation was further continued for the remaining period, the cultivated broth was filtered to remove the mycerium.

As for control, another cultivation was carried out under the same conditions as the above with exception that addition of the aqueous sodium acetate solution was eliminated.

The resulting N-acylpentapeptides contained in the filtrate was estimated according to the method aforementioned. The results thus obtained are shown in the following Table.

Table 1

| | pH Initial | Final | Dry Cells (g/dl) | Relative Yields Pepsidines* | Pepsidine C |
|---|---|---|---|---|---|
| Control | 6.5 | 8.8 | 1.12 | 100 | 100 |
| with Precursor | 6.5 | 9.1 | 1.20 | 112 | 114 |

*A mixture consisting of Pepsidines.

The quantitative estimation of the individual Pepsidines thus obtained, on the other hand, is carried out as follows:

A butanol extract of the cultivated broth is spotted on a thin layer plate of silica gel and is developed with Benzene : methanol : acetic acid (80 : 20 : 5 by volume). The spots corresponding to the individual Pepsidines detected by means of Rydon-Smith reaction are separately recovered by scratching out from the plate and extracted with water. The pepsin-inhibitory activity of the individual Pepsidines is then measured in the manner as aforementioned.

As is evident from the data in the above Table, the relative yields of the Pepsidines were increased by the addition of sodium acetate as the precursor.

The filtrate was salted out with ammonium sulfate, and the recovered product was dissolved in methanol. The methanol solution was purified through a successive chromatography on active carbon and an anion-exchange resin. There were obtained 3.9 grs. of Pepsidine C. In the similar manner, 3.2 grs. of Pepsidine C were obtained from the cultivated broth of the control.

EXAMPLE 2

15 Liters of a nutrient medium hereinafter called "nutrient medium B", were prepared which contained 5% of peptone, 0.1% of common salt, 0.1% of potassium dihydrogen phosphate, 0.0001% of ferrous sulfate, 0.0001% of manganese sulfate, 0.0001% of cupric sulfate and 0.0001% of zinc sulfate. To the nutrient medium B, there was added 1% of sodium acetate as the precursor.

The resulting nutrient medium was sterilized as usual in a 30 liter jar fermentator. After the sterilization, the total volume of the resulting nutrient medium was 14.5 liters and had pH 6.8.

As a control, another nutrient medium similar to the nutrient medium B was separately prepared without addition of sodium acetate.

To the two nutrient mediums thus prepared, there were inoculated Streptomyces naniwaensis EF 44-201 strain in the manner same as that in Example 1.

After the 40 hours' cultivations under aeration, the mycerin of the inoculated Streptomyces naniwaensis was removed from each of the cultivated liquor by filtration.

The data of the observations on the cultivated broths are shown as follows:

Table 2

| | pH Initial | Final | Dry Cells (g/dl) | Relative Yields Pepsidine | Pepsidine C |
|---|---|---|---|---|---|
| Control | 6.9 | 8.8 | 0.63 | 100 | 100 |
| with Precursor | 6.8 | 8.9 | 0.55 | 162 | 241 |

*A mixture consisting of Pepsidines.

In comparison of the above data, it is noted that the considerable increments in the yields of Pepsidines, and especially Pepsidine C as compared with those of control, were obtained.

EXAMPLE 3

Each 100 ml of the nutrient mediums A and B respectively prepared in the preceding Examples were devided into the shaking flasks of 50 ml capacity and the contents of the flasks were sterilized as usual. The sterilized mediums in the flasks were inoculated with Streptomyces naniwaensis EF 44-201 strain and the cultivations under shaking were continued at 27°C.

Toward the end of 48 hours' cultivation, there were added 1% of sodium acetate as the precursor to the cultivating medium A, and the cultivation was continued for further 24 hours.

To the nutrient medium B, on the other hand, 1% of sodium acetate was added at the commencement of cultivation and the cultivation was carried out continuously for 96 hours.

The data of the observations on the cultivated broths are shown as follows:

Table 3

| Cultivation medium | hrs. | Addit'n of precursor (%) | Time of addition | pH of Filtrate | Relative Yields Pepsidines* | Pepsidine C |
|---|---|---|---|---|---|---|
| A | 72 | 0 | — | 8.3 | 100 | 100 |
| A | 72 | 1 | after 48 hrs. | 8.5 | 123 | 123 |
| B | 96 | 0 | — | 8.9 | 100 | 100 |
| B | 96 | 1 | Beginning | 8.9 | 153 | 193 |

*A mixture consisting of Pepsidines.

In comparative inspection of the results with those of the controls, a marked increment in the productivity of the mixed Pepsidines and Pepsidine C are noted with respect to the cultivated broths to which the precursor was added.

EXAMPLE 4

0.1% of S-acetylglutathion or AHMHA as the precursor was added to the abovementioned nutrient medium B at the time of the preparation. Cultivations and the determinations on the cultivated broth were carried out in accordance with those employed in Example 2. The data of the observations are listed belows:

Table 4

| Addition of Precursor | Conc'n (%) | Time of addition | Cultiv'n (hrs.) | pH of Filtrate | Relative Yields Pepsidines* | Pepsidine C |
|---|---|---|---|---|---|---|
| S-Acetyl-glutathion | 0 | — | 96 | 8.8 | 100 | 100 |
| ditto | 0.1 | Beginning | 96 | 8.9 | 152 | 184 |
| AHMHA | 0 | — | 72 | 8.5 | 100 | 100 |
| ditto | 0.1 | Beginning | 72 | 8.6 | 189 | 234 |

*A mixture consisting of Pepsidines

As is evident from the abovementioned data, the additions of the particular precursors considerably promote the yields of the Pepsidines as compared with those of the controls in which the precursors were absent. It is particularly noted that the effect coursed by the precursors is remarkable in the productivity of Pepsidine C.

What is claimed is:

1. In the method for providing N-acylpentapeptides by cultivation of the Streptomyces naniwaensis EF44-201 (ATCC 21689) strain, the improvement wherein the culture is carried out in a nutrient medium containing a precursor of said N-acylpentapeptides selected from the group consisting of S-acetylglutathion, and 4-amino-3-hydroxy-6-methyl-heptanoic acid or derivatives thereof.

2. In the method as claimed in claim 1 wherein the N-acylpentapeptide is N-acetylpentapeptide.

3. In the method as claimed in claim 1 wherein the precursor is S-acetylglutathion.

4. In the method as claimed in claim 1 wherein the precursor is 4-amino-3-hydroxy-6-methyl-heptanoic acid.

* * * * *